United States Patent Office 3,636,078
Patented Jan. 18, 1972

---

3,636,078
2-PROPYNYL ESTER OF N-ACETYL ANTHRANILIC ACID
Chester E. Pawloski, Bay City, Mich., assignor to The Dow Chemical Company, Midland, Mich.
No Drawing. Filed Nov. 3, 1969, Ser. No. 873,599
Int. Cl. C07c 103/32
U.S. Cl. 260—471 R          1 Claim

ABSTRACT OF THE DISCLOSURE

The present invention is a new compound, namely the 2-propynyl ester of N-acetyl anthranilic acid corresponding to the formula:

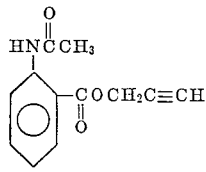

The compound is suitable for use as a herbicide.

GENERAL SUMMARY

The present invention is directed to the new and useful compound corresponding to the formula:

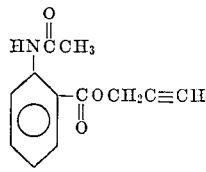

The compound is a white crystalline solid melting at 122–123° C. which is somewhat soluble in many common organic solvents and of low solubility in water. The compound has been found to be useful as a herbicide.

In a representative operation, the new compound may be prepared by reacting N-acetyl anthranilic acid with propargyl bromide. The reaction may be carried out in the presence of potassium carbonate and conveniently in a solvent such as acetone. The amount of the reactants to be employed is not critical, some of the desired product being produced with any proportion of ingredients. Good results are obtained when employing substantial equimolar proportions of the reactants. The compound preparation takes place smoothly while the reaction mass is being heated at reflux under atmospheric pressure.

Usually, in carrying out the preparation, the reactants and solvent are mixed together and the resulting mixture is heated at reflux temperature for a period of time sufficient to assure substantial completion of the reaction. Upon completion of the reaction, the compound is recovered. Usually, the compound is crystallized from the product solution after removal of by-product impurities. If desired, the so-recovered solid product can be further purified as by recrystallization from a fresh solvent, for example.

DESCRIPTION OF PREFERRED EMBODIMENTS

In a representative operation, about 25 grams (0.2 mole) of N-acetyl anthranilic acid, about 20 grams (0.2 mole) propargyl bromide, and about 22 grams (0.2 mole) potassium carbonate were dispersed in 200 milliliters of acetone and the resulting mixture was stirred for 20 hours while being maintained at reflux temperature and under atmospheric pressure. Sufficient water was added to provide a two-phase mixture, the organic layer containing the product in solution. The organic layer was separated from the aqueous phase. The solids that remained were extracted with acetone and filtered, and this acetone solution added to the original organic product solution. The acetone was evaporated and the 2-propynyl ester ester of N-acetyl anthranilic acid compound was recovered as a white solid melting at 122–123° C. The structure was confirmed by infrared spectroscopy analysis.

The novel product of the present invention is useful as a herbicide. When the product is so employed, the unmodified substance can be utilized. However, the present invention also embraces the use of the compound in a formualtion. Thus, for example, the compound can be dispersed on a finely divided solid and employed therein as a dust. Also, the compound, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water or water-in-oil emulsions, or water dispersions, with or without the addition of wetting, dispersing or emulsifying agents.

In a representative operation, application of the 2-propynyl ester of N-acetyl anthranilic acid compound at a concentration of 50 pounds per acre gave complete inhibition of broadleaf beans.

I claim:
1. 2-propynyl ester of N-acetyl anthranilic acid.

References Cited
UNITED STATES PATENTS
2,906,614   9/1959   Hopkins et al. _____ 71—111

LORRAINE A. WEINBERGER, Primary Examiner
L. A. THAXTON, Assistant Examiner

U.S. Cl. X.R.
71—111